Figure 19:
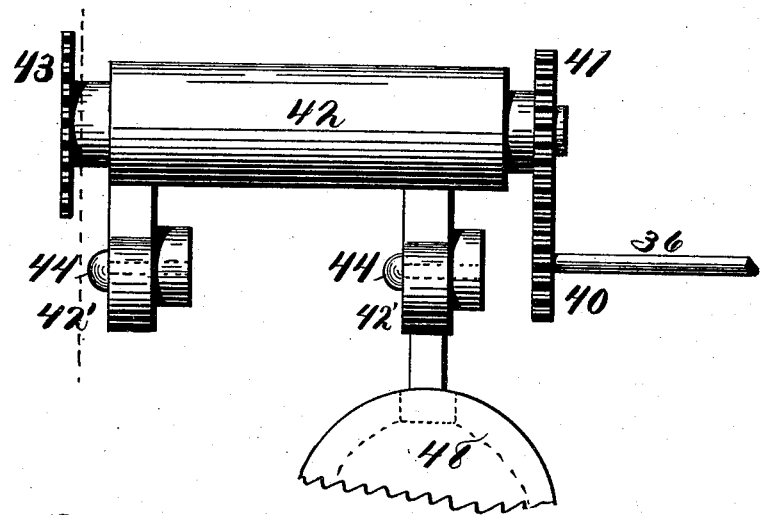

(No Model.) 7 Sheets—Sheet 1.
A. T. BROWN.
TYPE MAKING MACHINE.
No. 572,673. Patented Dec. 8, 1896.
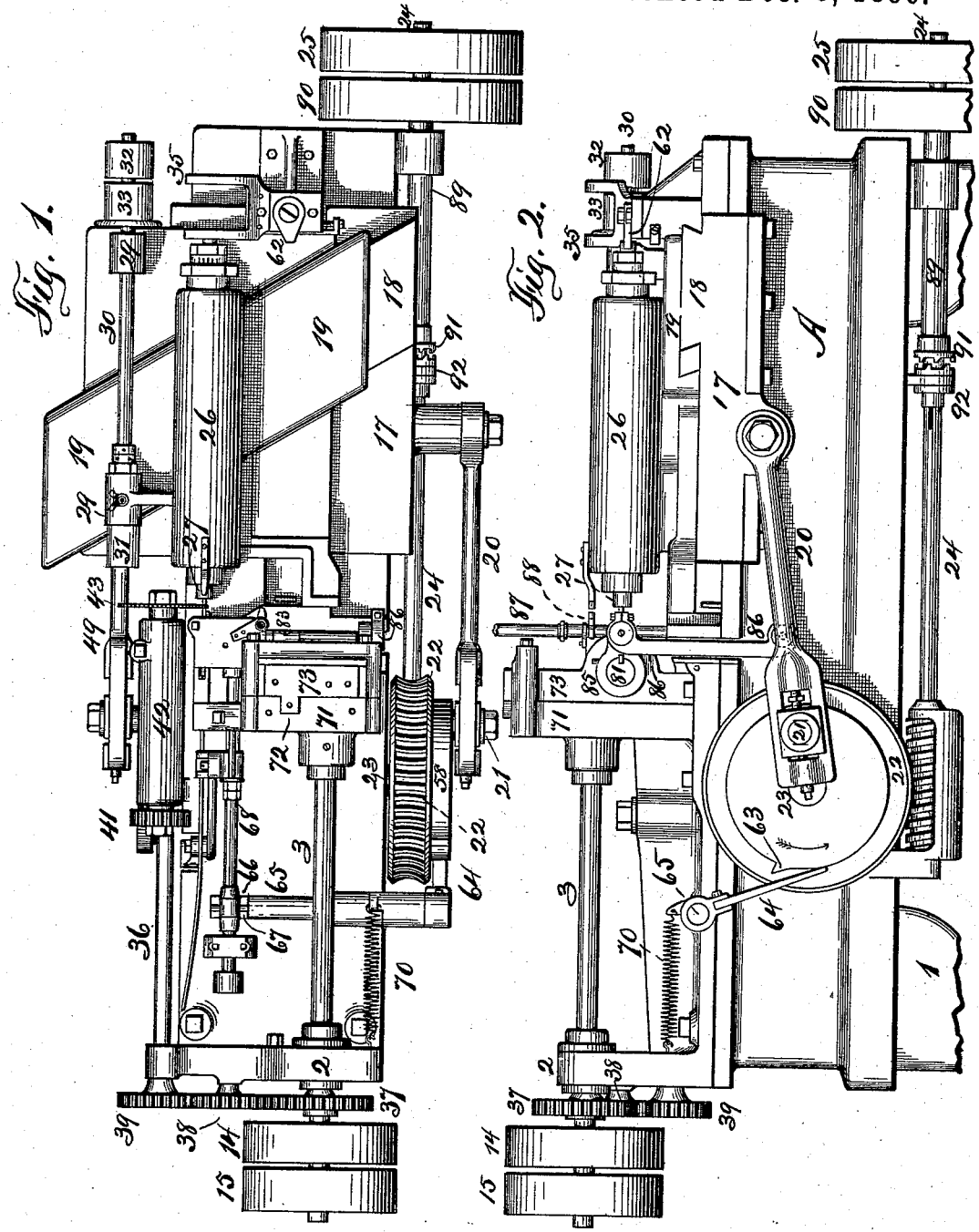
WITNESSES:
Chas. N. Marvin.
N. M. Bosch
INVENTOR
Alexander T. Brown.
BY
Smith & Davison
ATTORNEYS.

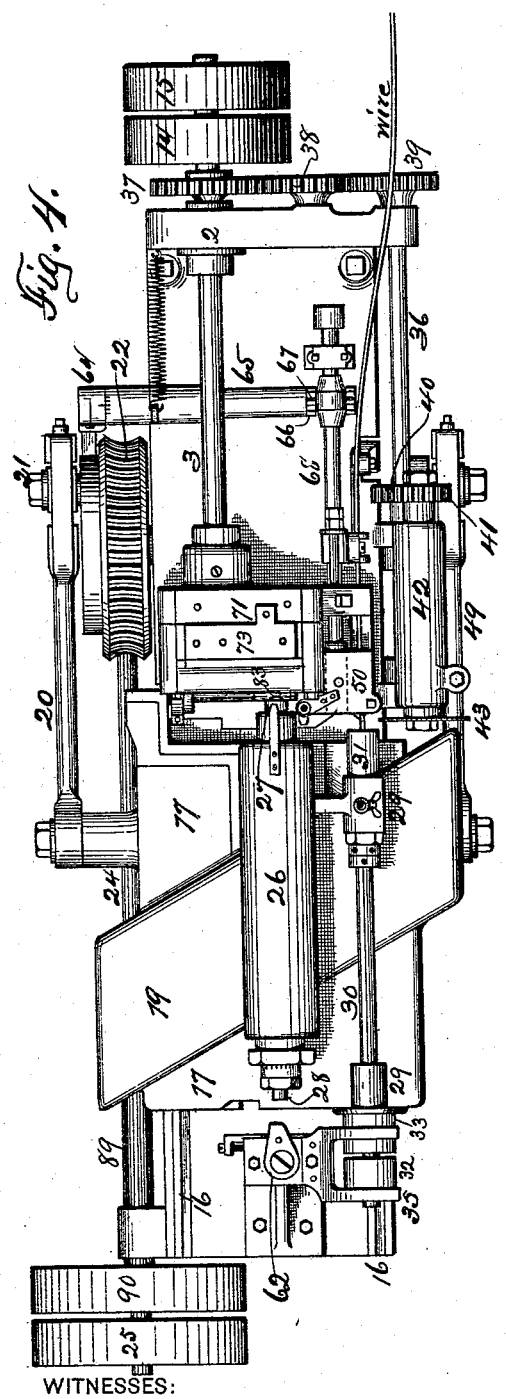

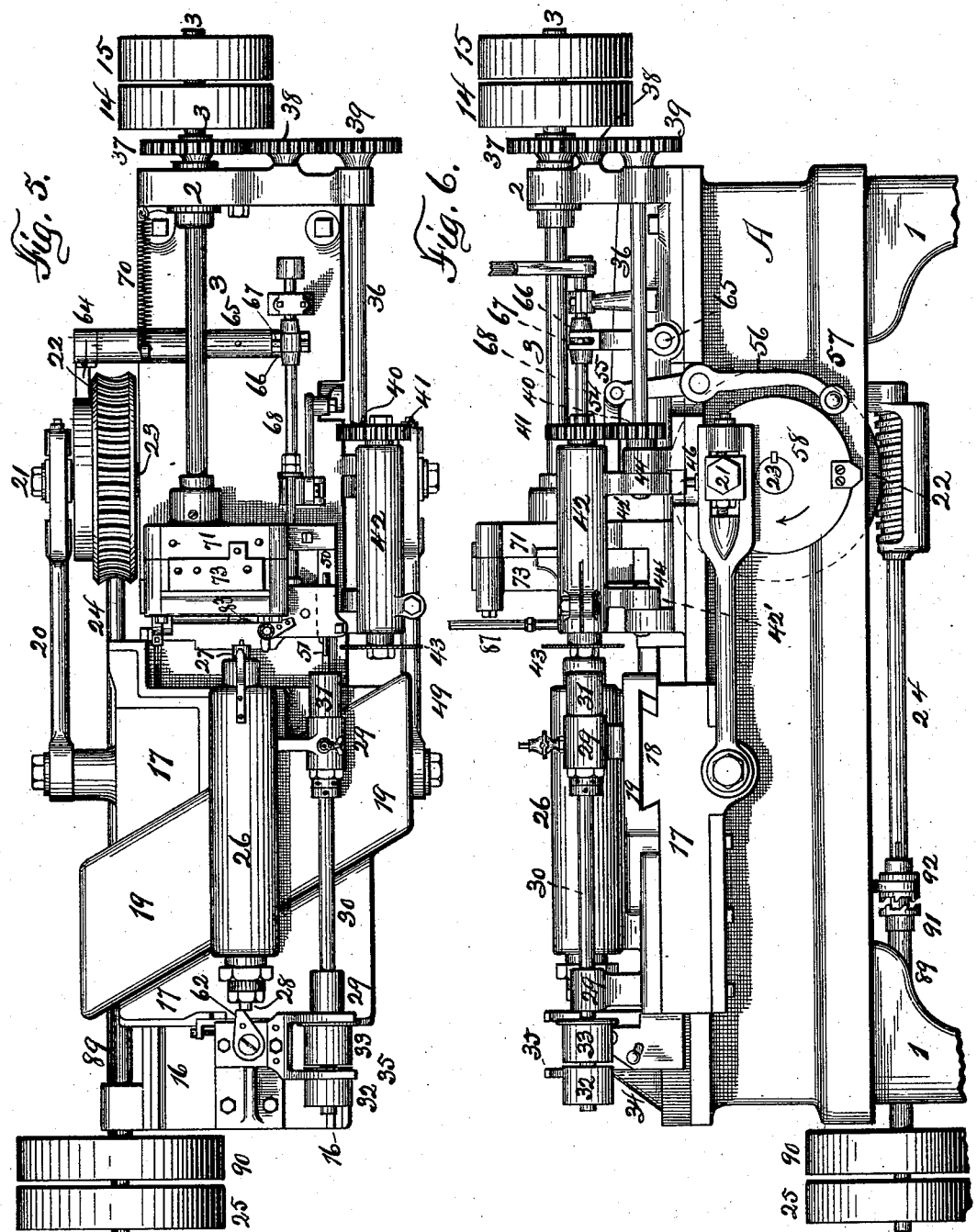

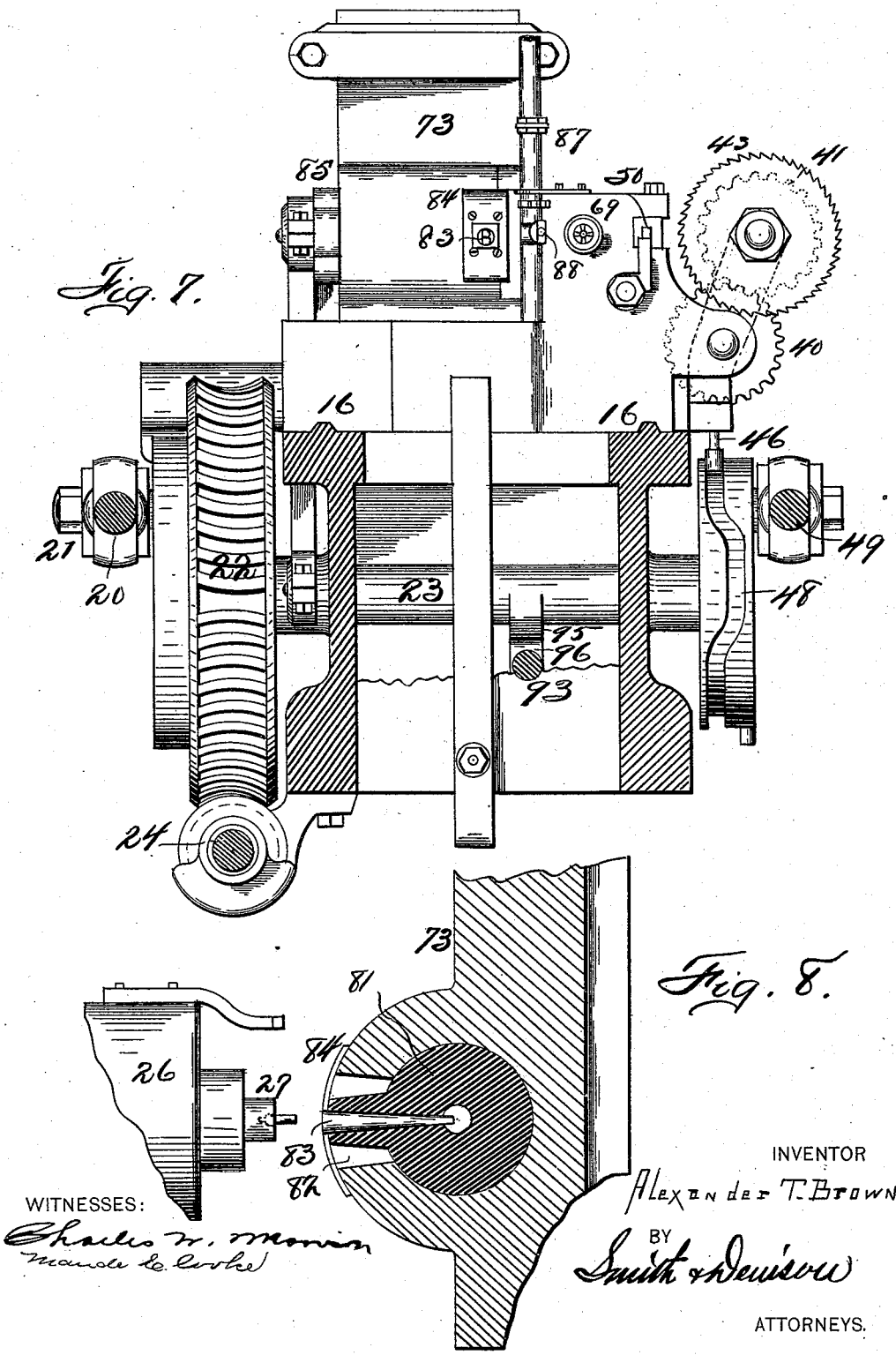

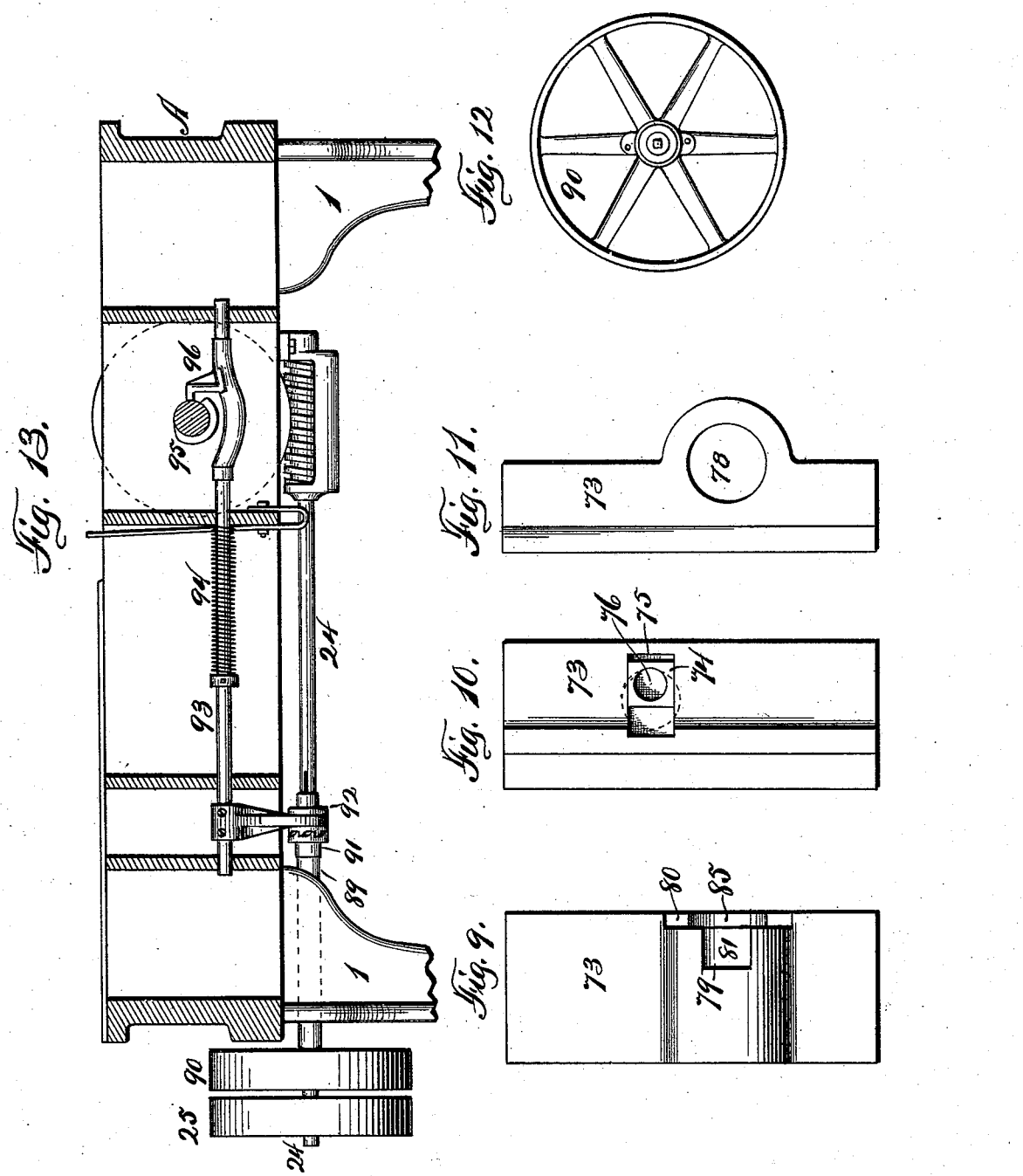

(No Model.) 7 Sheets—Sheet 6.
A. T. BROWN.
TYPE MAKING MACHINE.
No. 572,673. Patented Dec. 8, 1896.
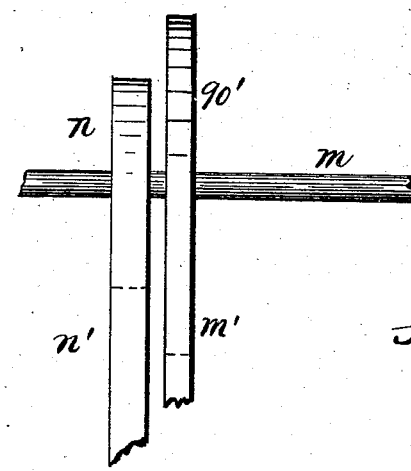
Fig. 14.
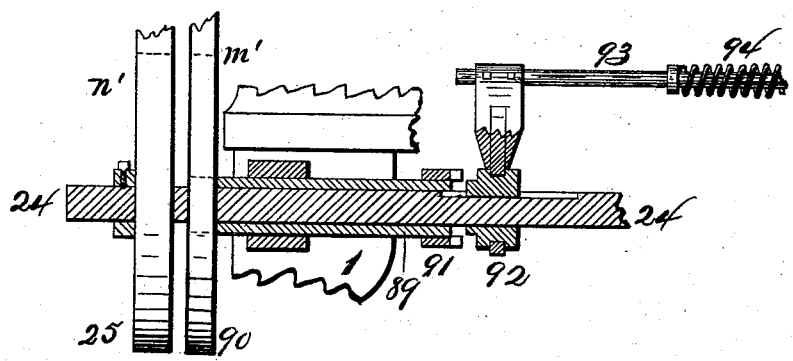
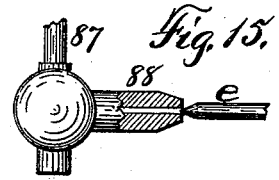
Fig. 15.
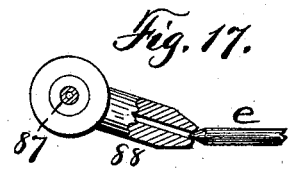
Fig. 17.
Fig. 16.
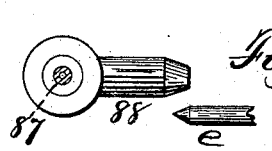
Fig. 18.
INVENTOR
Alexander T. Brown
WITNESSES:
E. S. Borst
C. W. Marvin
BY
Smith & Denison
his ATTORNEYS.

(No Model.)  7 Sheets—Sheet 7.

A. T. BROWN.
TYPE MAKING MACHINE.

No. 572,673.  Patented Dec. 8, 1896.

WITNESSES:
Chas. W. Marvin.
Jessie E. Murray.

INVENTOR
Alexander T. Brown
BY
Smith & Denison
his ATTORNEYS.

UNITED STATES PATENT OFFICE.

ALEXANDER T. BROWN, OF SYRACUSE, NEW YORK.

TYPE-MAKING MACHINE.

SPECIFICATION forming part of Letters Patent No. 572,673, dated December 8, 1896.

Application filed March 8, 1894. Serial No. 502,818. (No model.)

*To all whom it may concern:*

Be it known that I, ALEXANDER T. BROWN, of Syracuse, in the county of Onondaga, in the State of New York, have invented new and useful Improvements in Type-Making Machines, of which the following, taken in connection with the accompanying drawings, is a full, clear, and exact description.

My invention relates to type-making machines of the class shown and described in the Letters Patent granted to me October 11, 1892, No. 484,135, which are adapted to automatically produce, from a rod or continuous wire, type having signs, symbols, characters, or letters upon one end, the bodies of the type being cut to length and having their base ends of uniform size, shape, pattern, or taper.

My object is to improve the construction and operation of the machine in the following particulars: by providing it with means whereby the type-blank, after its base has been shaped and after it has been cut to length, is, as to its other end, made more or less pointed or convex preparatory to the swaging or forming of the sign, symbol, character, or letter thereon; by providing the machine with an improved swaging or matrix-die mechanism by which the metal is spread laterally from the center or apex of the pointed or convex end of the blank in forming or swaging the letter or other character upon the end, whereby the metal is condensed and hardened, said die being mounted or seated in an oscillating or rocking shaft or holder, whereby the face of the letter is curved or transversely concaved when it is to be used to print upon a convex surface, as upon the impression-platen of a type-writing machine, in which case the arc of curve of the letter is of the same radius as that of the platen, said matrix-die being adapted to produce the letter or character upon the blank either in relief or in intaglio, said blank being cold during the operations hereinafter described; by further providing means whereby a variable speed is imparted, a quick speed for the shifting of the table over to trim or shape the base of the blank and to chuck said blank after it is cut off and to shift the table to present the blank to the pointing-cutter and to shift the table again to bring the blank into line with the die, and then to feed the table forward slowly to bring the blank into engagement with the die; by further providing means whereby the pointing-cutter is fed forward to engage with the type-blank and is automatically retracted, and further provided with an air-blast whereby the chips and oil are blown off from the pointed blank, the valve thereof being opened by the engagement of the blank therewith as the table is being shifted to carry the blank from the pointing-cutter to the die.

My invention consists in the several novel features of construction and operation hereinafter described, and which are specifically set forth in the claims hereunto annexed.

It is constructed as follows, reference being had to the accompanying drawings, in which—

Figure 20:
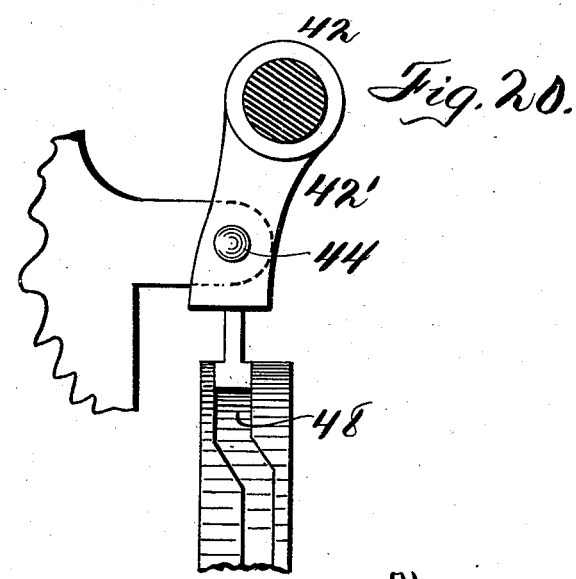

Figure 1 is a top plan of the machine, showing the saw cutting off a type-blank from the wire after the base end has been shaped or tapered. Fig. 2 is a front elevation of the same. Fig. 3 is a top plan of the machine in the act of pointing a type-blank. Fig. 4 is a like view of the same in the act of swaging or forming the character upon the pointed end. Fig. 5 is a like view of the same in the act of knocking the finished type out from the chuck. Fig. 6 is a rear elevation. Fig. 7 is a vertical transverse sectional elevation taken in front of the matrix-die. Fig. 8 is a sectional elevation of the die-holder and slide and the type-holding chuck. Fig. 9 is a front elevation of the slide-holder detached. Fig. 10 is a side elevation of the slide, detailing the means by which it is reciprocated. Fig. 11 is a side elevation of the slide-holder. Fig. 12 is an elevation of the variable-speed drive-pulley. Fig. 13 is a sectional detail illustrating the mechanism by which the speed is varied. Fig. 14 is a sectional elevation of the variable-speed mechanism. Fig. 15 is a sectional elevation of the air-blast and the type-blank about to engage with it. Fig. 16 is a top plan of the same, partly sectional. Fig. 17 is a top plan, partly sectional, showing the valve swung and opened by the engagement of the blank with it. Fig. 18 is a top plan of the valve closed again, the blank having passed it. Fig. 19 is a front elevation of the saw-arbor bearing the arms carrying it, the cam by which it is oscillated, and the gearing for driving said arbor. Fig. 20 is a sectional elevation of the same and part of the frame of the machine upon the dotted line in Fig. 19.

A is the bed, having legs 1, and 2 is a bearing thereon in which the drive-shaft 3 is journaled, which carries the fast and loose pulleys 14 15, the driving-belt being shifted by any ordinary means.

Ways 16 carry the table 17, the latter having diagonal ways 18, upon which the slide 19 is mounted. The table 17 is reciprocated longitudinally by the pitman 20, crank-pin 21, worm-gear 22 on shaft 23, and worm-shaft 24, driven by the pulley 25. A tubular block 26 is mounted upon the slide 19 and carries the chuck 27, and 28 is a rod loose in said block and projecting therefrom and extending into the inner end of the chuck. Bearings 29 journal the shaft 30, which carries the tubular cutter 31, and 32 33 are the fast and loose pulleys on said shaft, and 35 is a forked belt-shifter mounted upon a standard 34 upon the bed. A shaft 36 is journaled in bearings above the bed and driven by the gear 37 on shaft 3, the pinion 38, and the gear 39 on said shaft 36, and this, through the gear 40 and pinion 41 upon the saw-shaft sleeve or bearing, journaled in bearings 42, drives the cut-off saw 43.

Arms 42' carry the saw-shaft and are pivoted upon pivots 44, and one of said arms has a stud 46 projecting from its lower end, which engages with a cam-groove in the edge of the cam-pulley 48, and the saw is swung in or out by said cam, the pinion 41 rocking upon the gear 40. A pitman 49 connects this cam to the table 17, so that this cam is rotated by the traverse of said table.

A sleeve 50 guides the wire 51 and has a head 54, receiving the pin 55 on the pivoted arm 56, carrying the roller 57, which engages with the cam 58 upon the shaft 23, so that thereby said sleeve is reciprocated to feed the wire forward and leave it projecting beyond the sleeve, when it is brought into the rotating cutter 31, which turns off the wire, either straight or tapered, whereupon the cutter is retracted and the chuck is shifted to receive the tapered end of said wire, whereupon the cam 48 throws the saw forward and cuts off the wire. All this is as described in my Letters Patent above referred to, and therefore it is not herein more specifically referred to, and the shifting movements of the table and slide are herein only mentioned for the same reason.

The type-blank thus chucked and cut off is pointed by the following mechanism: A cam 63 is mounted upon the gear 22, with which the arm 64 upon the rock-shaft 65 engages, Fig. 2, the latter being journaled across the bed, and 66 is a rock-arm secured to said rock-shaft and provided with a fork which engages with a pin 67 on one side or with pins on the opposite side of the pointer-shaft 68, which is journaled in bearings erected upon the bed and is reciprocated forward to bring the cutter 69, Fig. 7, upon said shaft into engagement with the end of the type-blank and to point it, round it off, or make the end more or less convex by the engagement of the arm 64 with the cam 63, and when disengaged the spring 70 throws the pointer-shaft and its connections back to their normal position. While the blank is being thus pointed the pitman 20 is on the center, the table being shifted to the left, Fig. 3, to the full extent, and the interval of time while the table and slide are thus at rest is sufficient to accomplish the pointing or finishing off of the blank ready for the next step, the forming of the letter or character thereon.

To form the letter or character, the chuck is shifted into alinement with the die and brought forward to bring the type-blank into engagement with said die, Fig. 4, in the same manner as shown and described in said patent, such forward movement being continued until the letter or character is fully formed by swaging, the swaging pressure being in a direct line, the line of the movement of the table, and it is finished just as the pitman 20 passes the center on the opposite side from Fig. 3, and then the movement is reversed and the swaged type is knocked out of the chuck by means of the rod 28 engaging with the dog 62, substantially as shown and described in said patent.

The matrix-die mechanism is constructed and operated as follows, (see Figs. 1, 2, 7, 8, 9, 10, and 11:) A post 71 is erected upon the bed, in which the shaft 3 has a bearing, and provided with a vertical guideway 72 to receive the slide 73, to which the shaft is eccentrically connected, a block 74 being mounted and adapted to reciprocate horizontally in a slot 75 in the slide, and 76 being a pin upon and eccentric to the end of the shaft 3, fitting into and free to rotate in said block, whereby the rotation of said shaft reciprocates said slide vertically. This slide is cross-bored, as at 78, and mortised in front, as at 79 and at 80.

The die-holder consists of an oscillating shaft 81, seated in said cross-bore and provided with a boss 82, bored on a line radial to said shaft to receive the die 83, said boss fitting in the mortise 79, and 84 is a cover-plate secured to said boss and closing the mortises 79 80. A collar 85 is secured upon the end of the shaft 81 and is provided with a crank-arm which is pivotally connected to the top of the rocking bearing-bar 86, the lower end of which is pivotally connected to the bed, standing in a groove therein. All this is so that the rotation of the shaft 3 vertically reciprocates the slide, which oscillates the die-holder and thereby rocks the die upon the end of the typle-blank and swages the letter or character thereon. The apex of the point or convexity of the type-blank first encounters the die, and the action thereof is first to force and swage down the point, creating first the central portion of the letter and then spreading, expanding, and compacting the metal to fill out the angles and corners of the lines and produce all of the recesses, cavities, and concavities inherent to a perfect letter, either in relief or in intaglio, and at the same time hardening the working face of the type, and also at the same time concaving the face of the type longitudinal to the letter upon the arc of a circle of the same radius as the radius of the oscillation of the die, so that the letter, when used upon a type-writing machine, will fit the convexity of the printing roller or platen and always make a clean imprint upon the paper.

Inasmuch as oil or a chip or chips, or both, are liable to adhere to the pointed end of the blank, I provide a cleaner, consisting of an air-pipe 87, connected to a compressor, (not shown,) a rotating spring-controlled valve in the pipe, and an arm 88, connected to said valve or its stem, said arm being also the nozzle; and when the chucked and pointed blank is being shifted to the die the blank will strike against said arm and swing it to one side, thereby opening the valve and permitting a modicum of compressed air to escape as a blast upon the point and blow off all the oil and other extraneous matters adhering to said point, and as it passes said arm the spring will close the valve again, throwing said arm back to its normal position.

*Variable-speed mechanism.*—This mechanism is designed to regulate the speed of the traverse of the table and the slide thereon, permitting it to operate with high speed at all times except when the blank is being forced into the die, when the speed is slow, having been automatically reduced just at the instant of the encounter of the blank with said die, so that the swaging operation and the forward feed of the table during it are much slower than the other operations, whereby the die is protected from damage and the letters are more perfectly formed. Upon the shaft 24 a sleeve 89 is loosely mounted, carrying a pulley 90 on one end and upon the other a clutch member 91, the other member being slidingly secured onto said shaft. The pulley 90 is driven by a pulley 90' upon the overhead shaft $m$ and the pulley 25 by a pulley $n$ on said shaft $m$, and $m'$ and $n'$ are the respective belts. The pulley 25 is the slow-speed pulley, driving the worm slowly. The clutch member 92 is provided with an arm to which the clutch-shifting rod 93 is secured, 94 being a spring on said rod normally under compression to throw said sliding clutch member into engagement with the other member, and 95 is a cam upon the shaft 23 in engagement with an arm 96 upon the rod 93 and operating to separate the clutch members. The pulley 90 is only in operation when the clutch members are engaged, and then drives the worm at higher speed and causing the pulley 25 to slip in its belt, or this pulley may be a friction-pulley and slip on its shaft, although its belt is not stopped, and when they are out of such engagement then the pulley 25 drives the worm at slower speed, the sleeve still running at high speed and the shaft rotating within it. The duration of each speed is controlled for high speed by the length of the space between the ends of the cam and for low speed by the length of the working face of the cam.

What I claim as my invention, and desire to secure by Letters Patent, is—

1. The combination with a traversing table, a slide mounted diagonally thereon and a chuck upon the slide of a rotating cutter adapted to point the type-blank carried by the chuck.

2. The combination with a traversing table, a slide mounted diagonally thereon, and a chuck upon the slide, of a base-shaping cutter, and a cutter adapted to point the type-blank.

3. The combination with a traversing table, a slide mounted diagonally thereon and a chuck upon the slide, of a base-shaping cutter, a second cutter adapted to point the type-blank, and a matrix-die adapted to swage the type-character upon the pointed end of said blank.

4. In a machine for making type from a coil of wire, the combination with a reciprocating chuck, holding a type-blank severed from the wire, of a reciprocating and rotating cutter engaging with the end of the blank projecting from said chuck, as and for the purposes set forth.

5. In a type-making machine, a bed, a standard thereon, and a vertically-reciprocating slide mounted in a guide in said standard, in combination with an oscillating die-holder journaled in said slide, and a rocking bearing-bar connected to a crank upon the die-holder and to said bed, and means to actuate said slide.

6. In a type-making machine, a reciprocating chuck, in combination with an oscillating shaft, having a lateral arm, provided with a die-seat, and means to oscillate said shaft.

7. In a type-making machine, a bed, a standard thereon provided with ways, a slide in said ways and a die-holder mounted and adapted to oscillate in said slide, in combination with a chuck to hold a type-blank and reciprocated in a direct line toward and from the die, and means to vertically reciprocate said slide and rock the die upon the end of the type-blank held by the chuck in engagement therewith.

8. In a type-making machine, the combination with a traversing table, a chuck mounted thereon, and a driving-gear connected by a pitman to said table, of a worm driving said gear, a shaft driving said worm, a pulley upon said shaft, a sleeve upon said shaft and a pulley upon said sleeve a clutch having one member upon said sleeve and the other upon and adapted to be traversed upon said shaft, a cam upon the drive-gear shaft and a shifting-rod engaging with said cam to shift the movable member of said clutch and suitable means to shift the driving-belt from one pulley to the other.

9. In a type-making machine, a bed, a traversing table thereon, a slide traversing said table diagonally, a blank-holding chuck upon said slide, and means to traverse said table and the slide thereon, a rotating cutter brought thereby into alinement to point the wire, a chuck brought thereby into position to receive the pointed wire, a cut-off, a cutter to which the chuck is next brought by said movement into position to point the end of the type-blank projecting from the chuck, and a matrix-die to which the chuck is thereafter brought for swaging the pointed end of the type-blank, in combination.

In witness whereof I have hereunto set my hand this 1st day of February, 1894.

ALEXANDER T. BROWN.

In presence of—
C. W. SMITH,
HOWARD P. DENISON.